United States Patent
Mochida

(10) Patent No.: US 9,164,883 B2
(45) Date of Patent: Oct. 20, 2015

(54) PARALLEL PROCESSING DEVICE

(71) Applicant: FUJITSU LIMITED, Kawasaki-shi (JP)

(72) Inventor: Takayasu Mochida, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 287 days.

(21) Appl. No.: 13/722,494

(22) Filed: Dec. 20, 2012

(65) Prior Publication Data

US 2013/0246733 A1    Sep. 19, 2013

(30) Foreign Application Priority Data

Mar. 19, 2012   (JP) ................. 2012-061920

(51) Int. Cl.
  *G06F 15/16*   (2006.01)
  *G06F 12/02*   (2006.01)
  G06F 9/38    (2006.01)

(52) U.S. Cl.
  CPC .......... *G06F 12/0215* (2013.01); *G06F 9/3853* (2013.01); *G06F 9/3881* (2013.01); *G06F 9/3885* (2013.01)

(58) Field of Classification Search
  CPC ............................... G06F 9/3885; G06F 7/24
  USPC ......................................................... 712/20
  See application file for complete search history.

(56) References Cited

U.S. PATENT DOCUMENTS 3,956,735  A  *  5/1976  Cassonnet ..................... 712/231
5,765,012  A  *  6/1998  Wilkinson et al. ............... 712/16
5,805,915  A  *  9/1998  Wilkinson et al. ............... 712/20
7,127,589  B2     10/2006 Nishikawa et al.
7,162,620  B2 *   1/2007  Magoshi ....................... 712/241
7,979,637  B2     7/2011  Adachi
2006/0253654 A1 * 11/2006 Adachi ......................... 711/123

(Continued)

FOREIGN PATENT DOCUMENTS

EP       0858039 A2    8/1998
JP       10-083379     3/1998

(Continued)

OTHER PUBLICATIONS

EESR—Extended European Search Report of European Patent Application No. 12198462.9 dated Jun. 30, 2014.

(Continued)

*Primary Examiner* — Aimee Li
*Assistant Examiner* — Trang Ta
(74) *Attorney, Agent, or Firm* — Fujitsu Patent Center

(57) ABSTRACT

A parallel processing device includes a processing sequence management unit that reads commands of the command corresponding to a parallel processing start bit to the command corresponding to a parallel processing completion bit from a sequence command storage in sequence to make the sequence command storage output the commands to a first address management unit and a second address management unit, the first address management unit refers to the sequence commands read from the sequence command storage in order from the head to find the command that a first processing execution unit executes, and then instructs the first processing execution unit to execute the command, and the second address management unit refers to the sequence commands read from the sequence command storage in order from the head to find the command that a second processing execution unit executes, and then instructs the second processing execution unit to execute the command.

4 Claims, 11 Drawing Sheets

(56) References Cited

U.S. PATENT DOCUMENTS

2007/0226468 A1* 9/2007 Grabner et al. .............. 712/220
2012/0023312 A1   1/2012 Isomura

FOREIGN PATENT DOCUMENTS

| JP | 11-161491   | 6/1999  |
| JP | 2005-108086 | 4/2005  |
| JP | 2006-313422 | 11/2006 |

OTHER PUBLICATIONS

Burns D: "Loop-Based Concurrency Identified As Best At Exploiting Parallelism", Computer Technology Review, Westworld Production, Beverly Hill, CA, US, vol. 8, No. 16, Dec. 21, 1988, XP000119261, ISSN: 0278-9647, pp. 22,23.

* cited by examiner

F I G. 1
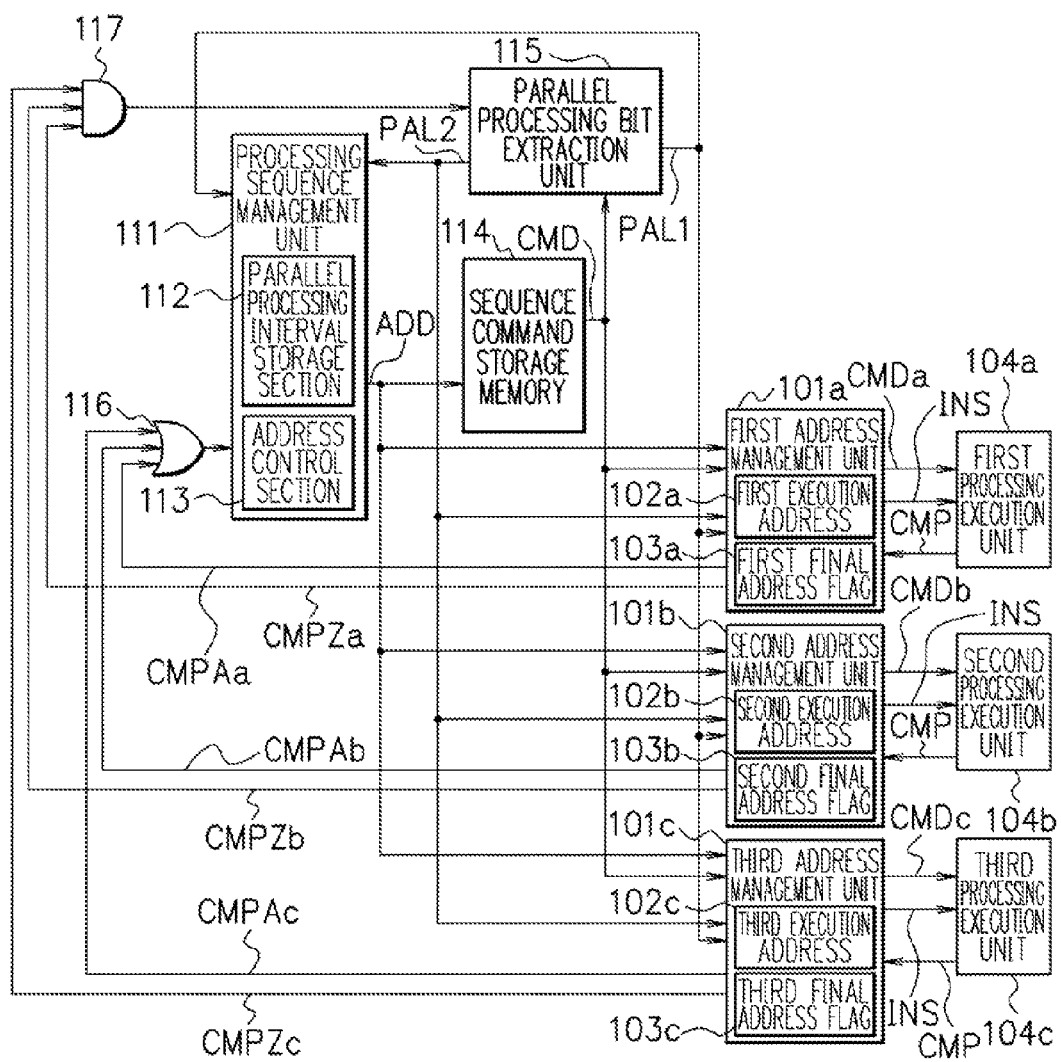

F I G. 2

| ADDRESS | COMMAND |
|---|---|
| 1 | A PROCESSING-1 |
| 2 | A PROCESSING-2 + PARALLEL PROCESSING START BIT |
| 3 | B PROCESSING-1 |
| 4 | C PROCESSING-1 |
| 5 | A PROCESSING-3 |
| 6 | B PROCESSING-2 |
| 7 | C PROCESSING-2 |
| 8 | A PROCESSING-4 + PARALLEL PROCESSING COMPLETION BIT |
| 9 | B PROCESSING-3 |

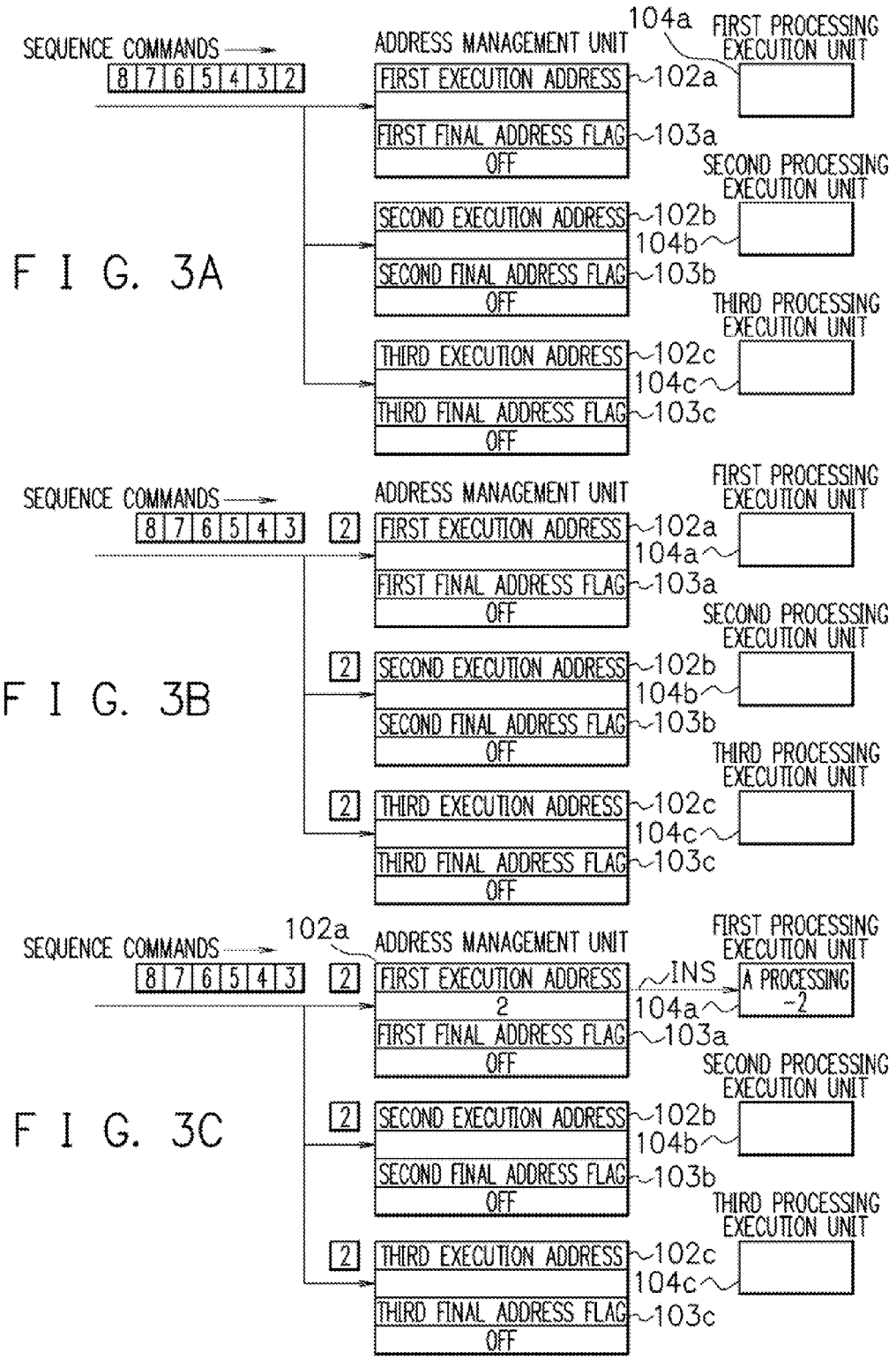

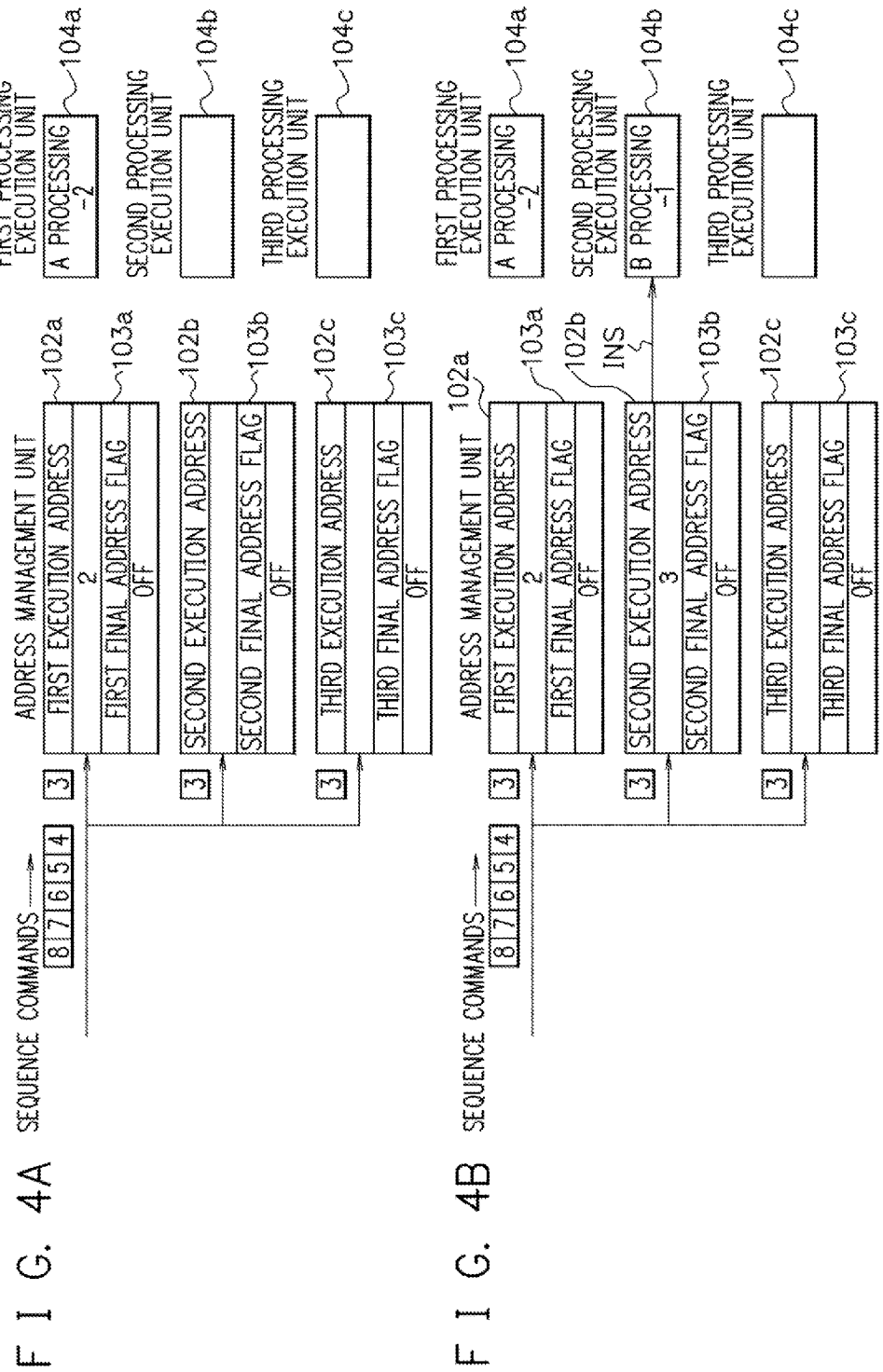

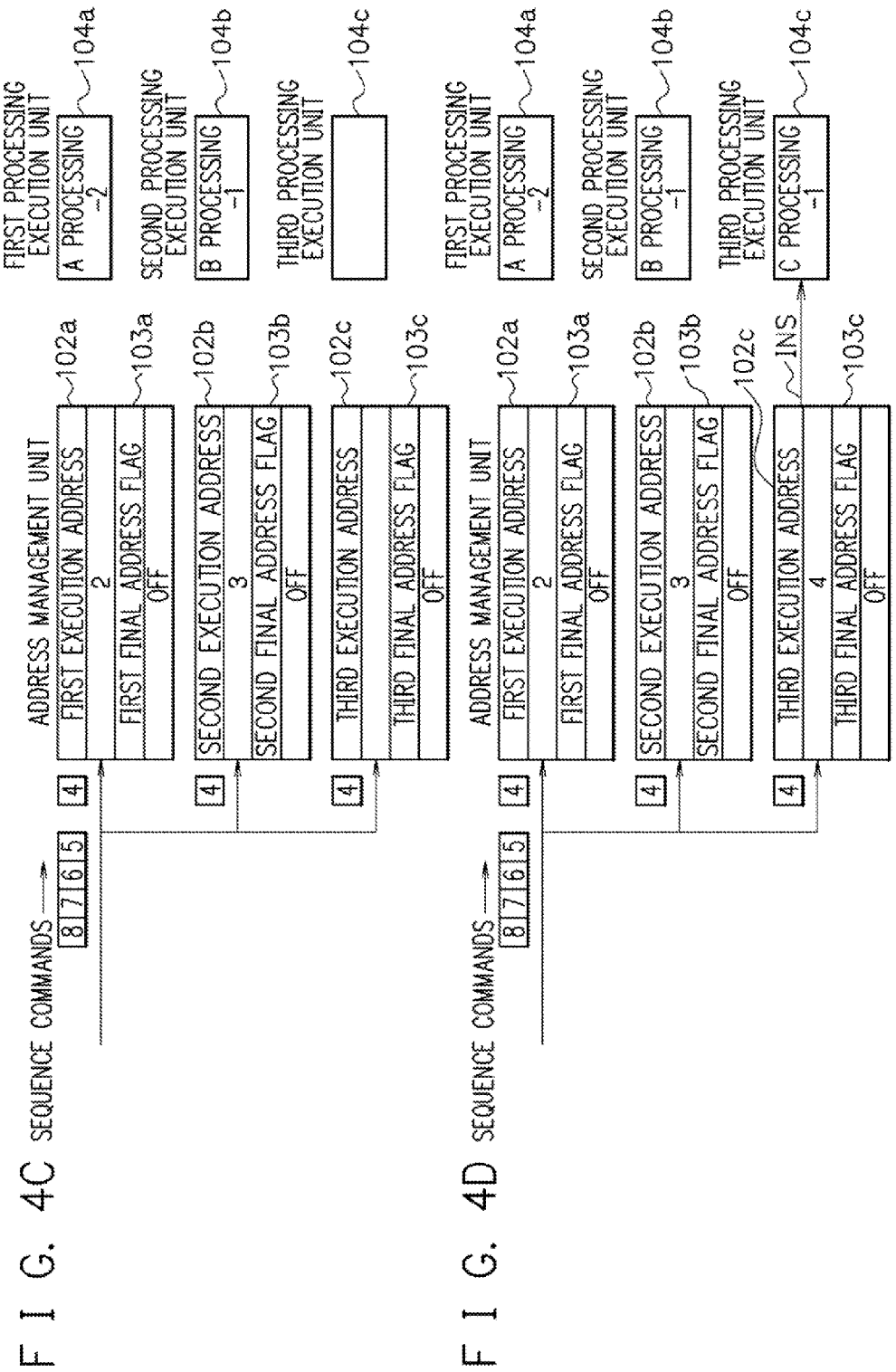

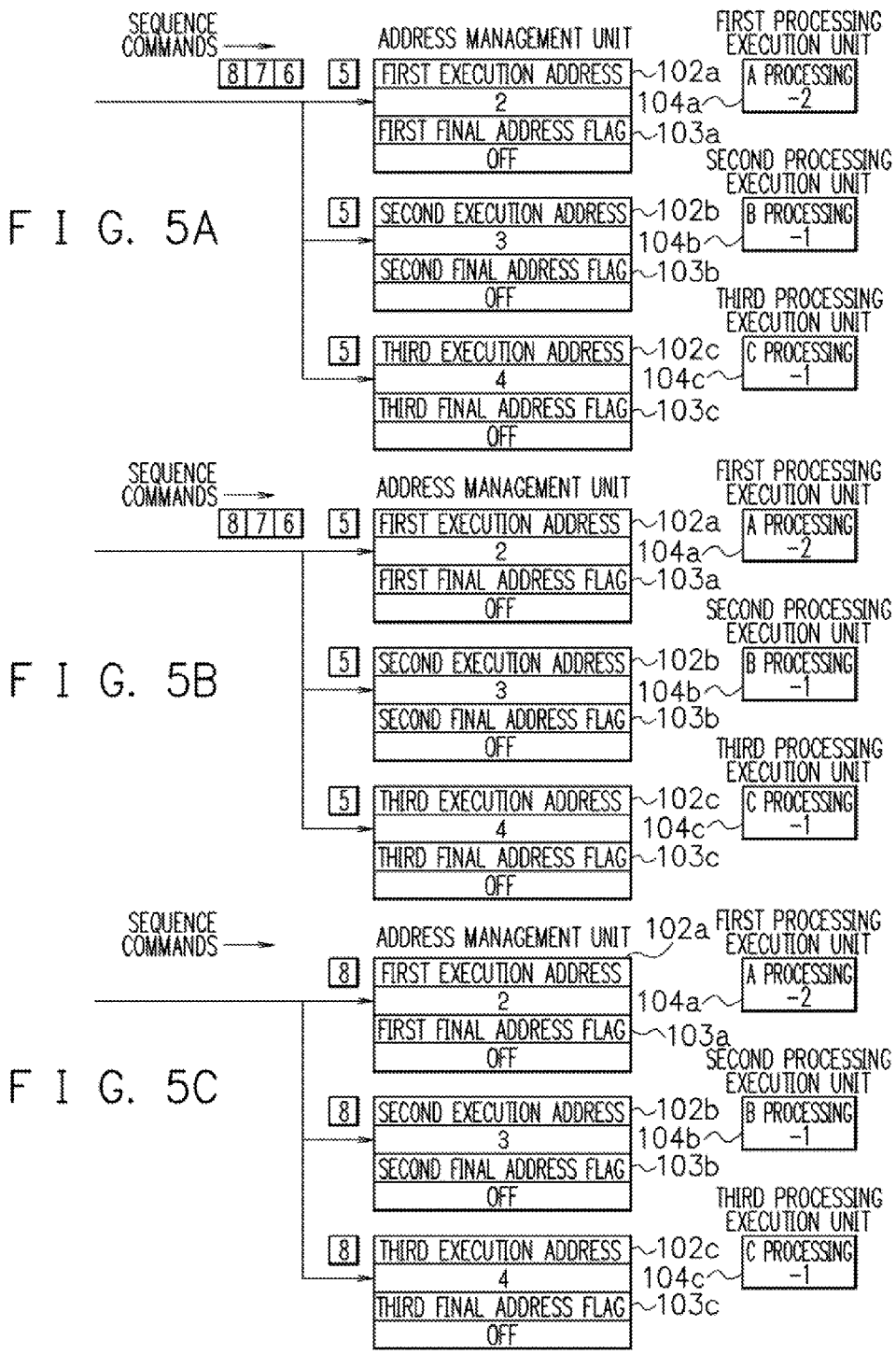

PARALLEL PROCESSING DEVICE

CROSS-REFERENCE TO RELATED APPLICATION

This application is based upon and claims the benefit of priority of the prior Japanese Patent Application No. 2012-061920, filed on Mar. 19, 2012, the entire contents of which are incorporated herein by reference.

FIELD

The embodiments relate to a parallel processing device.

BACKGROUND

There has been known a data processor multiprocessing a data-driven program and a control-driven program on the same pipeline, on an instruction-by-instruction basis (see, for example, Patent Document 1).

Further, there has been known a processor obtaining a data transfer instruction in a cache memory as a combination of plural instructions (see, for example, Patent Document 2).

Further, there has been known a general-purpose processor that fetches each instruction from an instruction register or fetches plural instructions from an instruction register at the same time and is capable of performing dynamic pipeline control that executes decoded plural operation instructions (see, for example, Patent Document 3).

There has been known a parallel computer system that is configured by a plurality of computers and a communication mechanism communicating them, employs a configuration in which a single job is divided into plural processes to be assigned to the computers, broadcasts a piece or pieces of process progress information of the single or plural process/processes to operate in each of the computers itself to all the computers via the communication mechanism, and executes processes to be assigned while being in synchronization with a process to operate in another computer in accordance with the piece or pieces of process progress information broadcasted via the communication mechanism (see, for example, Patent Document 4).

[Patent Document 1] Japanese Laid-open Patent Publication No. 2005-108086

[Patent Document 2] Japanese Laid-open Patent Publication No. 2006-313422

[Patent Document 3] Japanese Laid-open Patent Publication No. 11-161491

[Patent Document 4] Japanese Laid-open Patent Publication No. 10-83379

There can be considered a parallel processing device that includes: a plurality of processing execution units parallel processing commands; and a management unit supplying each command to be executed to the plural processing execution units. However, when the management unit manages all the processing execution units, there is caused a problem that a circuit scale is increased.

SUMMARY

A parallel processing device includes: a first processing execution unit that executes a command; a first address management unit that instructs the first processing execution unit to execute a command; a second processing execution unit that executes a command different from the command that the first processing execution unit executes, in parallel with the execution by the first processing execution unit; a second address management unit that instructs the second processing execution unit to execute a command; a sequence command storage memory that stores a sequence command in each address, stores a command for parallel processing start in a manner to correspond to a parallel processing start bit, and stores a command for parallel processing completion in a manner to correspond to a parallel processing completion bit; and a processing sequence management unit that reads the sequence commands of the command corresponding to the parallel processing start bit to the command corresponding to the parallel processing completion bit from the sequence command storage memory in sequence to make the sequence command storage memory output the sequence commands to the first address management unit and the second address management unit, in which the first address management unit, when referring to the sequence commands read from the sequence command storage memory in order from the head to find the command that the first processing execution unit executes, instructs the first processing execution unit to execute the command, and the second address management unit, when referring to the sequence commands read from the sequence command storage memory in order from the head to find the command that the second processing execution unit executes, instructs the second processing execution unit to execute the command.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a view depicting a configuration example of a parallel processing device according to a first embodiment;

FIG. 2 is a view depicting a memory content of a sequence command storage memory in FIG. 1;

FIG. 3A to FIG. 3C are views each for explaining a processing example of the parallel processing device in FIG. 1;

FIG. 4A to FIG. 4D are views each for explaining a processing example of the parallel processing device in FIG. 1;

FIG. 5A to FIG. 5C are views each for explaining a processing example of the parallel processing device in FIG. 1;

DESCRIPTION OF EMBODIMENTS (First Embodiment)

Figure 6A:
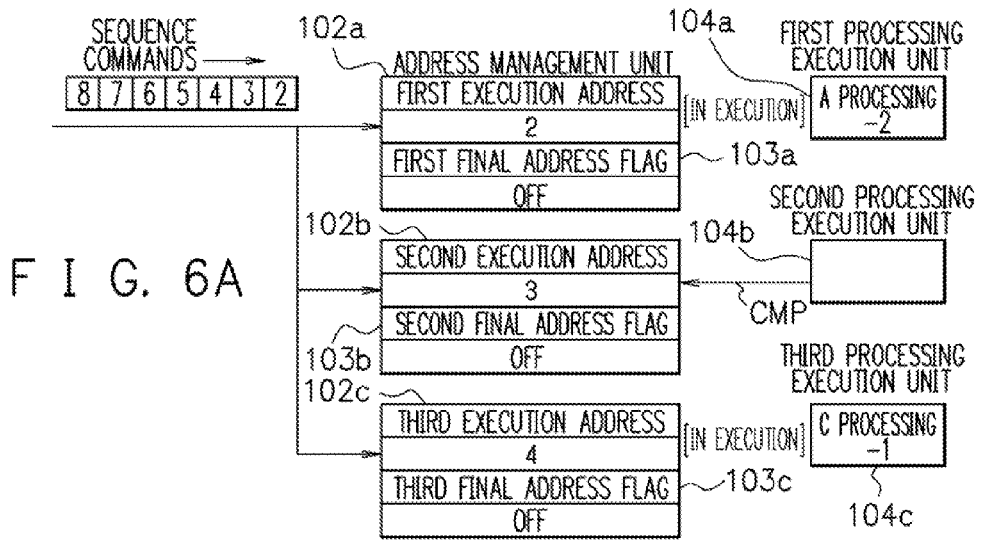
FIG. 6A and FIG. 6B are views each for explaining a processing example of the parallel processing device in FIG. 1.

FIG. 1 is a view depicting a configuration example of a parallel processing device according to a first embodiment. A first processing execution unit 104a executes a command CMDa for A processing. A first address management unit 101a stores a first execution address 102a and a first final address flag 103a therein, supplies the command CMDa for the A processing to the first processing execution unit 104a, and supplies an execution instruction INS to the first processing execution unit 104a to thereby instruct the first processing execution unit 104a to execute the command CMDa. When completing the execution of the command CMDa, the first processing execution unit 104a outputs a completion notification CMP to the first address management unit 101a.

A second processing execution unit 104b executes a command CMDb for B processing. A second address management unit 101b stores a second execution address 102b and a second final address flag 103b therein, supplies the command CMDb for the B processing to the second processing execution unit 104b, and supplies the execution instruction INS to the second processing execution unit 104b to thereby instruct the second processing execution unit 104b to execute the command CMDb. When completing the execution of the command CMDb, the second processing execution unit 104b outputs the completion notification CMP to the second address management unit 101b.

A third processing execution unit 104c executes a command CMDc for C processing. A third address management unit 101c stores a third execution address 102c and a third final address flag 103c therein, supplies the command CMDc for the C processing to the third processing execution unit 104c, and supplies the execution instruction INS to the third processing execution unit 104c to thereby instruct the third processing execution unit 104c to execute the command CMDc. When completing the execution of the command CMDc, the third processing execution unit 104c outputs the completion notification CMP to the third address management unit 101c.

As described above, the first processing execution unit 104a executes the command CMDa for the A processing, the second processing execution unit 104b executes the command CMDb for the B processing, and the third processing execution unit 104c executes the command CMDc for the C processing. For example, the command CMDa for the A processing is a command for addition processing, the command CMDb for the B processing is a command for multiplication processing, and the command CMDc for the C processing is a command for multiplication processing. The commands CMDa, CMDb, and CMDc may be commands different from one another, and may also be commands for combined various four arithmetic operations. The first processing execution unit 104a, the second processing execution unit 104b, and the third processing execution unit 104c can execute the commands in parallel to one another.

FIG. 2 is a view depicting a memory content of a sequence command storage memory 114 in FIG. 1. In each address ADD, a sequence command CMD is stored. For example, in the address ADD of the address of "1," the command CMD for "A processing-1" is stored. In the address ADD of the address of "2," the command CMD for "processing A-2" and a parallel processing start bit are stored. In the address ADD of the address of "3," the command CMD for "B processing-1" is stored. In the address ADD of the address of "4," the command CMD for "C processing-1" is stored. In the address ADD of the address of "5," the command CMD for "A processing-3" is stored. In the address ADD of the address of "6," the command CMD for "B processing-2" is stored. In the address ADD of the address of "7," the command CMD for "C processing-2" is stored. In the address ADD of the address of "8," the command CMD for "A processing-4" and a parallel processing completion bit are stored. In the address ADD of the address of "9," the command CMD for "B processing-3" is stored.

The first processing execution unit 104a needs to execute the commands CMD for "A processing-1" in the address of "1," "A processing-2" in the address of "2," "A processing-3" in the address of "5," and "A processing-4" in the address of "8" in order in accordance with the order of the address ADD.

The second processing execution unit 104b needs to execute the commands CMD for "B processing-1" in the address of "3," "B processing-2" in the address of "6," and "B processing-3" in the address of "9" in order in accordance with the order of the address ADD.

The third processing execution unit 104c needs to execute the commands CMD for "C processing-1" in the address of "4" and "C processing-2" in the address of "7" in order in accordance with the order of the address ADD.

The sequence command storage memory 114 stores a command for parallel processing start therein in a manner to correspond to the parallel processing start bit and stores a command for parallel processing completion therein in a manner to correspond to the parallel processing completion bit. For example, the parallel processing start bit is stored in a manner to correspond to the command CMD for "A processing-2" in the address of "2" being the command for parallel processing start. The parallel processing completion bit is stored in a manner to correspond to the command CMD for "A processing-4" in the address of "8" being the command for parallel processing completion. Thereby, the sequence commands of the command CMD for "A processing-2" in the address of "2" to the command CMD for "A processing-4" in the address of "8" are parallel processed by the first processing execution unit 104a, the second processing execution unit 104b, and the third processing execution unit 104c. The commands CMD in and before the address of "1," which are before the parallel processing start bit in the address of "2," and the commands CMD in and after the address of "9," which are after the parallel processing completion bit in the address of "8," are not parallel processed but are processed in order in accordance with the order of the address ADD.

FIG. 3A to 3C, FIG. 4A to 4D, FIG. 5A to 5C, FIG. 6A and FIG. 6B, FIG. 7A and FIG. 7B, FIG. 8A and FIG. 8B, and FIG. 9 are views each for explaining a processing example of the parallel processing device in FIG. 1. Hereinafter, the processing examples of the parallel processing device in FIG. 1 will be explained with reference to these drawings.

First, a processing sequence management unit 111 outputs the address ADD to the sequence command storage memory 114, the first address management unit 101a, the second address management unit 101b, and the third address management unit 101c in order from the first address ADD because a parallel processing execution instruction signal PAL1 is at low level. Concretely, the processing sequence management unit 111 outputs the address ADD in the address of "1." When receiving the address ADD in the address of "1," the sequence command storage memory 114 outputs the command CMD for "A processing-1" stored in the address ADD of the address of "1" to a parallel processing bit extraction unit 115, the first address management unit 101a, the second address management unit 101b, and the third address management unit 101c. The parallel processing bit extraction unit 115 does not receive the parallel processing start bit or the parallel processing completion bit from the sequence command storage memory 114, to thus let the parallel processing execution instruction signal PAL1 and a parallel processing interval notification signal PAL2 remain at low level.

The first address management unit 101a judges that the received command CMD for "A processing-1" in the address of "1" is a code for the command CMDa for the A processing, supplied the command CMD to the first processing execution unit 104a as the command CMDa for the A processing, and supplies the execution instruction INS to the first processing execution unit 104a to thereby instruct the first processing execution unit 104a to execute the command CMDa. Then, the first processing execution unit 104a starts the execution of the command CMDa.

The second address management unit 101b judges that the received command CMD for "A processing-1" in the address of "1" is not a code for the command CMDb for the B processing and does not instruct the second processing execution unit 104b to execute the command. Similarly, the third address management unit 101c judges that the received command CMD for "A processing-1" in the address of "1" is not a code for the command CMDc for the C processing and does not instruct the third processing execution unit 104c to execute the command.

When completing the execution of the command CMDa, the first processing execution unit 104a outputs the completion notification CMP to the first address management unit 101a. Then, the first address management unit 101a outputs a processing completion notification CMPAa at high level. Then, a logical sum (OR) circuit 116 outputs a processing completion notification at high level.

Then, the processing sequence management unit 111, due to the parallel processing interval notification signal PAL2 being at low level, increments the address ADD by an address control section 113 to output the address ADD in the address of "2" to the sequence command storage memory 114, the first address management unit 101a, the second address management unit 101b, and the third address management unit 101c. When receiving the address ADD in the address of "2," the sequence command storage memory 114 outputs the command CMD for "A processing-2" and the parallel processing start bit that are stored in the address ADD of the address of "2" to the parallel processing bit extraction unit 115, the first address management unit 101a, the second address management unit 101b, and the third address management unit 101c. When receiving the parallel processing start bit from the sequence command storage memory 114, the parallel processing bit extraction unit 115 recognizes the parallel processing start to output the parallel processing execution instruction signal PAL1 at high level and the parallel processing interval notification signal PAL2 at high level to the processing sequence management unit 111, the first address management unit 101a, the second address management unit 101b, and the third address management unit 101c.

A parallel processing interval storage section 112 in the processing sequence management unit 111, when the parallel processing interval notification signal PAL2 changes from low level to high level, stores that the current address ADD in the address of "2" is the address of the parallel processing start bit.

When the parallel processing interval notification signal PAL2 is at low level, the processing sequence management unit 111 reads the single command as described above, and when the processing completion notification that the logical sum circuit 116 outputs becomes high level, the processing sequence management unit 111 reads the subsequent command CMD.

In contrast to this, the processing sequence management unit 111, when the parallel processing interval notification signal PAL2 becomes high level, increments the address ADD by the address control section 113 regardless of the processing completion notification that the logical sum circuit 116 outputs and outputs the subsequent address ADD in the address of "3" to the sequence command storage memory 114, the first address management unit 101a, the second address management unit 101b, and the third address management unit 101c. When receiving the address ADD in the address of "3," the sequence command storage memory 114 outputs the command CMD for "B processing-1" stored in the address ADD of the address of "3" to the parallel processing bit extraction unit 115, the first address management unit 101a, the second address management unit 101b, and the third address management unit 101c. The parallel processing bit extraction unit 115 maintains the parallel processing execution instruction signal PAL1 at high level and the parallel processing interval notification signal PAL2 at high level.

Next, the processing sequence management unit 111, since the parallel processing interval notification signal PAL2 remains at high level, increments the address ADD by the address control section 113 regardless of the processing completion notification that the logical sum circuit 116 outputs and outputs the subsequent address ADD in the address of "4" to the sequence command storage memory 114, the first address management unit 101a, the second address management unit 101b, and the third address management unit 101c. When receiving the address ADD in the address of "4," the sequence command storage memory 114 outputs the command CMD for "C processing-1" stored in the address ADD of the address of "4" to the parallel processing bit extraction unit 115, the first address management unit 101a, the second address management unit 101b, and the third address management unit 101c. The parallel processing bit extraction unit 115 maintains the parallel processing execution instruction signal PAL1 at high level and the parallel processing interval notification signal PAL2 at high level.

Next, the processing sequence management unit 111, since the parallel processing interval notification signal PAL2 remains at high level, increments the address ADD by the address control section 113 regardless of the processing completion notification that the logical sum circuit 116 outputs and outputs the subsequent address ADD in the address of "5" to the sequence command storage memory 114, the first address management unit 101a, the second address management unit 101b, and the third address management unit 101c. When receiving the address ADD in the address of "5," the sequence command storage memory 114 outputs the command CMD for "A processing-3" stored in the address ADD of the address of "5" to the parallel processing bit extraction unit 115, the first address management unit 101a, the second address management unit 101b, and the third address management unit 101c. The parallel processing bit extraction unit 115 maintains the parallel processing execution instruction signal PAL1 at high level and the parallel processing interval notification signal PAL2 at high level.

Next, the processing sequence management unit 111, since the parallel processing interval notification signal PAL2 remains at high level, increments the address ADD by the address control section 113 regardless of the processing completion notification that the logical sum circuit 116 outputs and outputs the subsequent address ADD in the address of "6" to the sequence command storage memory 114, the first address management unit 101a, the second address management unit 101b, and the third address management unit 101c. When receiving the address ADD in the address of "6," the sequence command storage memory 114 outputs the command CMD for "B processing-2" stored in the address ADD of the address of "6" to the parallel processing bit extraction unit 115, the first address management unit 101a, the second address management unit 101b, and the third address management unit 101c. The parallel processing bit extraction unit 115 maintains the parallel processing execution instruction signal PAL1 at high level and the parallel processing interval notification signal PAL2 at high level.

Next, the processing sequence management unit 111, since the parallel processing interval notification signal PAL2 remains at high level, increments the address ADD by the address control section 113 regardless of the processing completion notification that the logical sum circuit 116 outputs and outputs the subsequent address ADD in the address of "7" to the sequence command storage memory 114, the first address management unit 101a, the second address management unit 101b, and the third address management unit 101c. When receiving the address ADD in the address of "7," the sequence command storage memory 114 outputs the command CMD for "C processing-2" stored in the address ADD of the address of "7" to the parallel processing bit extraction unit 115, the first address management unit 101a, the second address management unit 101b, and the third address management unit 101c. The parallel processing bit extraction unit 115 maintains the parallel processing execution instruction signal PAL1 at high level and the parallel processing interval notification signal PAL2 at high level.

Next, the processing sequence management unit 111, since the parallel processing interval notification signal PAL2 remains at high level, increments the address ADD by the address control section 113 regardless of the processing completion notification that the logical sum circuit 116 outputs and outputs the subsequent address ADD in the address of "8" to the sequence command storage memory 114, the first address management unit 101a, the second address management unit 101b, and the third address management unit 101c. When receiving the address ADD in the address of "8," the sequence command storage memory 114 outputs the command CMD for "A processing-4" and the parallel processing completion bit that are stored in the address ADD of the address of "8" to the parallel processing bit extraction unit 115, the first address management unit 101a, the second address management unit 101b, and the third address management unit 101c. When receiving the parallel processing completion bit from the sequence command storage memory 114, the parallel processing bit extraction unit 115 changes the parallel processing interval notification signal PAL2 from high level to low level and maintains the high level of the parallel processing execution instruction signal PAL1.

The parallel processing interval storage section 112 in the processing sequence management unit 111, when the parallel processing interval notification signal PAL2 changes from high level to low level, stores that the current address ADD in the address of "8" is the address of the parallel processing completion bit.

The processing sequence management unit 111, when the parallel processing interval notification signal PAL2 becomes low level, stops outputting the address ADD, and reading in the sequence command storage memory 114 is also stopped.

As described above, the processing sequence management unit 111 reads the sequence commands of the command CMD in the address of "2" in which the parallel processing start bit exists to the command CMD in the address of "8" in which the parallel processing completion bit exists from the sequence command storage memory 114 in sequence.

Next, processing of the address management units 101a, 101b, and 101c in the case when the parallel processing execution instruction signal PAL1 and the parallel processing interval notification signal PAL2 are at high level will be explained. As depicted in FIG. 3A, the sequence commands in the address of "2" to the address of "8" are supplied from the sequence command storage memory 114 in sequence as described above. The final address flags 103a, 103b, and 103c are initialized to off.

First, as depicted in FIG. 3B, the command CMD and the parallel processing start bit in the address of "2" are supplied to the first address management unit 101a, the second address management unit 101b, and the third address management unit 101c.

Next, as depicted in FIG. 3C, the first address management unit 101a judges that the supplied command CMD for "A processing-2" in the address of "2" is the code for the command CMDa for the A processing, records the address ADD in the address of "2" as the first execution address 102a, supplies the command CMD for "A processing-2" to the first processing execution unit 104a as the command CMDa for the A processing, and supplies the execution instruction INS to the first processing execution unit 104a to thereby instruct the first processing execution unit 104a to execute the command CMDa. Then, the first processing execution unit 104a starts the execution of the command CMDa for "A processing-2." The first execution address 102a indicates the address ADD of the command CMD being executed by the first processing execution unit 104a.

The second address management unit 101b judges that the supplied command CMD for "A processing-2" in the address of "2" is not the code for the command CMDb for the B processing and does not instruct the second processing execution unit 104b to execute the command CMD.

Similarly, the third address management unit 101c judges that the supplied command CMD for "A processing-2" in the address of "2" is not the code for the command CMDc for the C processing and does not instruct the third processing execution unit 104c to execute the command CMD.

Next, as depicted in FIG. 4A, the command CMD in the address of "3" is supplied to the first address management unit 101a, the second address management unit 101b, and the third address management unit 101c.

Next, as depicted in FIG. 4B, the first address management unit 101a, due to the first processing execution unit 104a being in execution, refers to the supplied command CMD in the address of "3" and judges whether or not the command CMD for "A processing-2" in the address of "2" being executed is the final command for the A processing among the commands CMD of the command CMD in the address of "2" in which the parallel processing start bit exists to the command CMD in the address of "8" in which the parallel processing completion bit exists. Concretely, the command CMD for "B processing-1" in the address of "3" is not the code for the command CMDa for the A processing and is not the parallel processing completion bit, and thus it is not possible for the first address management unit 101a to judge whether or not the above-described command being executed is the final command, and the first address management unit 101a lets the first final address flag 103a remain off.

The second address management unit 101b judges that the supplied command CMD for "B processing-1" in the address of "3" is the code for the command CMDb for the B processing, records the address ADD in the address of "3" as the second execution address 102b, supplies the command CMD for "B processing-1" to the second processing execution unit 104b as the command CMDb for the B processing, and supplies the execution instruction INS to the second processing execution unit 104b to thereby instruct the second processing execution unit 104b to execute the command CMDb. Then, the second processing execution unit 104b starts the execution of the command CMDb for "B processing-1." The second execution address 102b indicates the address ADD of the command CMD being executed by the second processing execution unit 104b.

The third address management unit 101c judges that the supplied command CMD for "B processing-1" in the address of "3" is not the code for the command CMDc for the C processing and does not instruct the third processing execution unit 104c to execute the command CMD.

Next, as depicted in FIG. 4C, the command CMD in the address of "4" is supplied to the first address management unit 101a, the second address management unit 101b, and the third address management unit 101c.

Next, as depicted in FIG. 4D, the first processing execution unit 104a is in execution and similarly to the above, the command CMD for "C processing-1" in the address of "4" is not the code for the command CMDa for the A processing and is not the parallel processing completion bit, so that it is not possible for the first address management unit 101a to judge whether or not the above-described command being executed is the final command, and thus the first address management unit 101a lets the first final address flag 103a remain off.

Similarly, the second processing execution unit 104b is in execution and similarly to the above, the command CMD for "C processing-1" in the address of "4" is not the code for the command CMDb for the B processing and is not the parallel processing completion bit, so that it is not possible for the second address management unit 101b to judge whether or not the above-described command being executed is the final command, and thus the second address management unit 101b lets the second final address flag 103b remain off.

The third address management unit 101c judges that the supplied command CMD for "C processing-1" in the address of "4" is the code for the command CMDc for the C processing, records the address ADD in the address of "4" as the third execution address 102c, supplies the command CMD for "C processing-1" to the third processing execution unit 104c as the command CMDc for the C processing, and supplies the execution instruction INS to the third processing execution unit 104c to thereby instruct the third processing execution unit 104c to execute the command CMDc. Then, the third processing execution unit 104c starts the execution of the command CMDc for "C processing-1." The third execution address 102c indicates the address ADD of the command CMD being executed by the third processing execution unit 104c.

Next, as depicted in FIG. 5A, the command CMD in the address of "5" is supplied to the first address management unit 101a, the second address management unit 101b, and the third address management unit 101c.

Next, as depicted in FIG. 5B, the first address management unit 101a, due to the first processing execution unit 104a being in execution, judges that the command CMD for "A processing-3" in the address of "5" is the code for the command CMDa for the A processing, and since the command for the A processing exists among the addresses to the address in the address of "8" in which the parallel processing completion bit exists, the first address management unit 101a judges that the command being executed by the first processing execution unit 104a is not the final command, and determines the first final address flag 103a to be off.

The second processing execution unit 104b is in execution and similarly to the above, the command CMD for "A processing-3" in the address of "5" is not the code for the command CMDb for the B processing and is not the parallel processing completion bit, so that it is not possible for the second address management unit 101b to judge whether or not the above-described command being executed is the final command, and thus the second address management unit 101b lets the second final address flag 103b remain off.

Similarly, the third processing execution unit 104c is in execution, and the command CMD for "A processing-3" in the address of "5" is not the code for the command CMDc for the C processing and is not the parallel processing completion bit, so that it is not possible for the third address management unit 101c to judge whether or not the above-described command being executed is the final command, and thus the third address management unit 101c lets the third final address flag 103c remain off.

Next, the command CMD in the address of "6" is supplied to the first address management unit 101a, the second address management unit 101b, and the third address management unit 101c, and the processing similar to the above is performed. The second address management unit 101b, due to the second processing execution unit 104b being in execution, judges that the command CMD for "B processing-2" in the address of "6" is the code for the command CMDb for the B processing, and since the command for the B processing exists among the addresses to the address in the address of "8" in which the parallel processing completion bit exists, the second address management unit 101b judges that the command being executed by the second processing execution unit 104b is not the final command, and determines the second final address flag 103b to be off.

Next, the command CMD in the address of "7" is supplied to the first address management unit 101a, the second address management unit 101b, and the third address management unit 101c, and the processing similar to the above is performed. The third address management unit 101c, due to the third processing execution unit 104c being in execution, judges that the command CMD for "C processing-2" in the address of "7" is the code for the command CMDc for the C processing, and since the command for the C processing exists among the addresses to the address in the address of "8" in which the parallel processing completion bit exists, the third address management unit 101c judges that the command being executed by the third processing execution unit 104c is not the final command, and determines the third final address flag 103c to be off.

Next, as depicted in FIG. 5C, the command CMD and the parallel processing completion bit in the address of "8" are supplied to the first address management unit 101a, the second address management unit 101b, and the third address management unit 101c, and the processing similar to the above is performed. The first address management unit 101a, since the command in the address of "2" being executed by the first processing execution unit 104a is not the final command as described above, lets the first final address flag 103a remain off. Similarly, the second address management unit 101b, since the command in the address of "3" being executed by the second processing execution unit 104b is not the final command as described above, lets the second final address flag 103b remain off. Similarly, the third address management unit 101c, since the command in the address of "4" being executed by the third processing execution unit 104c is not the final command as described above, lets the third final address flag 103c remain off.

Thereby, the parallel processing in the three processing execution units 104a, 104b, and 104c is performed. Thereafter, the parallel processing device waits until the execution of one of the commands by the processing execution units 104a, 104b, and 104c is completed.

Next, as depicted in FIG. 6A, when completing the execution of the command, the second processing execution unit 104b outputs the completion notification CMP to the second address management unit 101b. When receiving the completion notification CMP, the second address management unit 101b outputs a processing completion notification CMPAb at high level. Incidentally, the first processing execution unit 104a and the third processing execution unit 104c are executing the commands. The logical sum circuit 116 outputs a logical sum signal of the processing completion notifications CMPAa and CMPAb, and a processing completion notification CMPAc. In the above case, when receiving the processing completion notification CMPAb at high level, the logical sum circuit 116 outputs the processing completion notification at high level to the processing sequence management unit 111. Then, the processing sequence management unit 111 outputs the addresses ADD of the address ADD in the address of "2" in which the parallel processing start bit exists to the address ADD in the address of "8" in which the parallel processing completion bit exists that are recorded by the parallel processing interval storage section 112 in sequence again similarly to the above. Then, correspondingly, the sequence command storage memory 114 outputs the commands CMD of the command CMD in the address of "2" (including the parallel processing start bit) to the command CMD in the address of "8" (including the parallel processing completion bit) in sequence again similarly to the above.

The first address management unit 101a does not instruct the first processing execution unit 104a to execute the new command because the first processing execution unit 104a is executing the command.

Figure 6B:
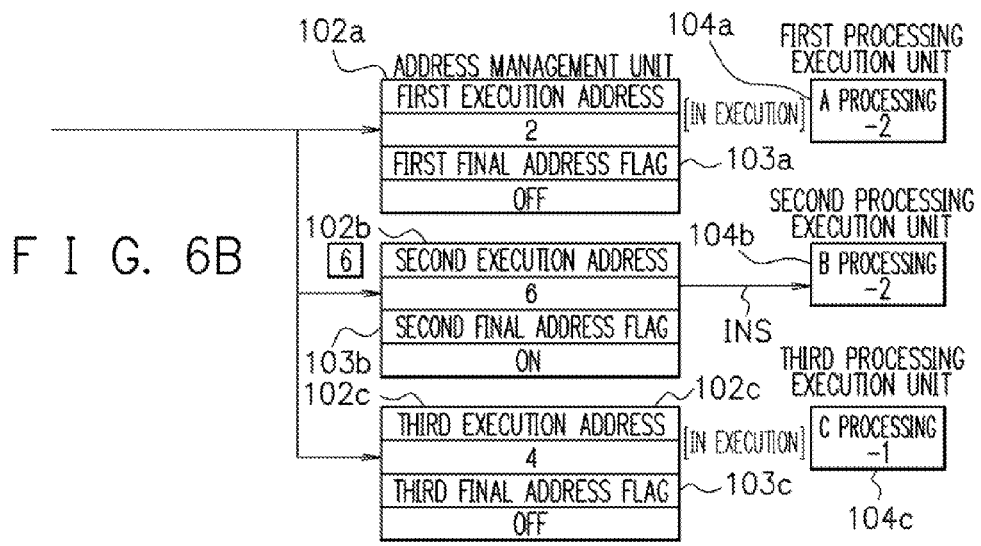

The second address management unit 101b receives the completion notification CMP from the second processing execution unit 104b to thus refer to the commands in order from the address ADD after the second execution address 102b in the address of "3." The second address management unit 101b judges that the command CMD for "C processing-1" in the address of "4" is not the code for the command CMDb for the B processing. Next, the second address management unit 101b judges that the command CMD for "A processing-3" in the address of "5" is not the code for the command CMDb for the B processing. Next, as depicted in FIG. 6B, the second address management unit 101b judges that the command CMD for "B processing-2" in the address of "6" is the code for the command CMDb for the B processing, records the address ADD in the address of "6" as the second execution address 102b, supplies the command CMD for "B processing-2" to the second processing execution unit 104b as the command CMDb for the B processing, and supplies the execution instruction INS to the second processing execution unit 104b to thereby instruct the second processing execution unit 104b to execute the command CMDb. Then, the second processing execution unit 104b starts the execution of the command CMDb for "B processing-2." Next, the second processing execution unit 104b is in execution and similarly to the above, the command CMD for "C processing-2" in the address of "7" is not the code for the command CMDb for the B processing and is not the parallel processing completion bit, so that it is not possible for the second address management unit 101b to judge whether or not the above-described command being executed is the final command, and thus the second address management unit 101b lets the second final address flag 103b remain off. Next, the second address management unit 101b judges that the command CMD for "A processing-4" in the address of "8" is not the code for the command CMDb for the B processing. Further, when receiving the parallel processing completion bit in the address of "8," the second address management unit 101b judges that the command in the address of "6" being executed by the second processing execution unit 104b is the final command and rewrites the second final address flag 103b to on.

The third address management unit 101c does not instruct the third processing execution unit 104c to execute the new command because the third processing execution unit 104c is executing the command.

Thereby, the parallel processing in the three processing execution units 104a, 104b, and 104c is performed. Thereafter, the parallel processing device waits until the execution of one of the commands by the processing execution units 104a, 104b, and 104c is completed.

Figure 7A:
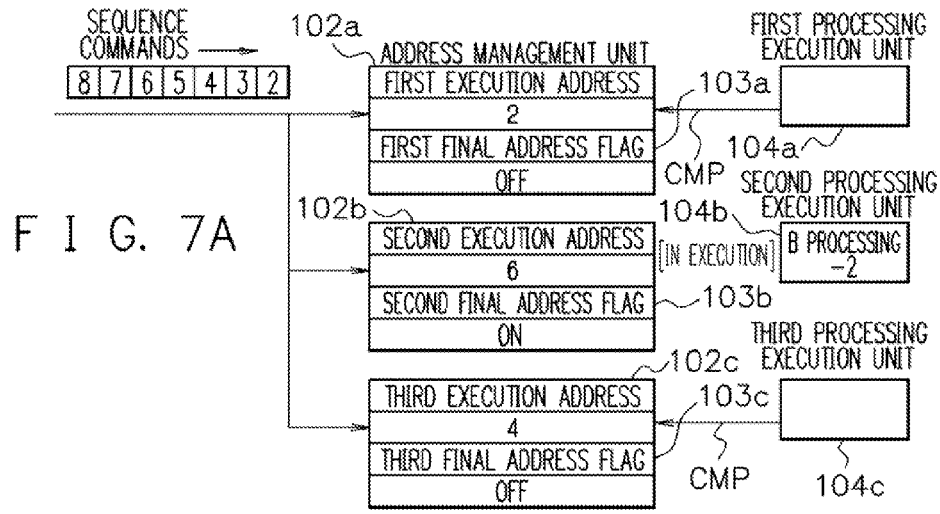
FIG. 7A and FIG. 7B are views each for explaining a processing example of the parallel processing device in FIG. 1.

Next, as depicted in FIG. 7A, when completing the execution of the command, the first processing execution unit 104a outputs the completion notification CMP to the first address management unit 101a, and when completing the execution of the command, the third processing execution unit 104c outputs the completion notification CMP to the third address management unit 101c. Incidentally, the second processing execution unit 104b is executing the command. When receiving the completion notification CMP, the first address management unit 101a outputs the processing completion notification CMPAa at high level. When receiving the completion notification CMP, the third address management unit 101c outputs the processing completion notification CMPAc at high level. When receiving the processing completion notifications CMPAa and CMPAc at high level, the logical sum circuit 116 outputs the processing completion notification at high level to the processing sequence management unit 111. Then, the processing sequence management unit 111 outputs the addresses ADD of the address ADD in the address of "2" in which the parallel processing start bit exists to the address ADD in the address of "8" in which the parallel processing completion bit exists that are recorded by the parallel processing interval storage section 112 in sequence again similarly to the above. Then, correspondingly, the sequence command storage memory 114 outputs the commands CMD of the command CMD in the address of "2" (including the parallel processing start bit) to the command CMD in the address of "8" (including the parallel processing completion bit) in sequence again similarly to the above.

Figure 7B:
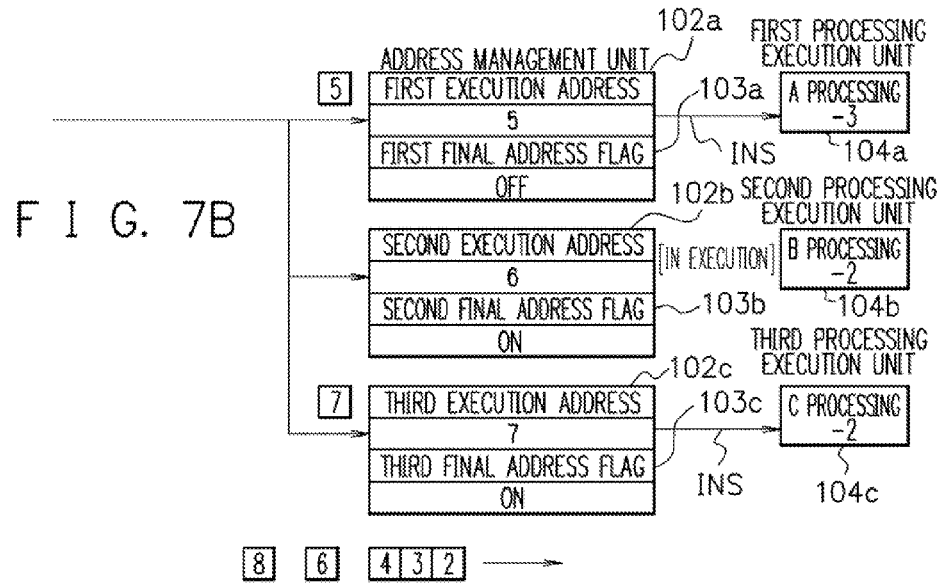

Next, the first address management unit 101a receives the completion notification CMP from the first processing execution unit 104a to thus refer to the commands in order from the address ADD after the first execution address 102a in the address of "2." The first address management unit 101a judges that the command CMD for "B processing-1" in the address of "3" is not the code for the command CMDa for the A processing. Next, the first address management unit 101a judges that the command CMD for "C processing-1" in the address of "4" is not the code for the command CMDa for the A processing. Next, as depicted in FIG. 7B, the first address management unit 101a judges that the command CMD for "A processing-3" in the address of "5" is the code for the command CMDa for the A processing, records the address ADD in the address of "5" as the first execution address 102a, supplies the command CMD for "A processing-3" to the first processing execution unit 104a as the command CMDa for the A processing, and supplies the execution instruction INS to the first processing execution unit 104a to thereby instruct the first processing execution unit 104a to execute the command CMDa. Then, the first processing execution unit 104a starts the execution of the command CMDa for "A processing-3." Next, the first processing execution unit 104a is in execution and similarly to the above, the command CMD for "B processing-2" in the address of "6" is not the code for the command CMDa for the A processing and is not the parallel processing completion bit, so that it is not possible for the first address management unit 101a to judge whether or not the above-described command being executed is the final command, and thus the first address management unit 101a lets the first final address flag 103a remain off. Next, the command CMD for "C processing-2" in the address of "7" is not the code for the command CMDa for the A processing and is not the parallel processing completion bit, so that it is not possible for the first address management unit 101a to judge whether or not the above-described command being executed is the final command, and thus the first address management unit 101a lets the first final address flag 103a remain off. Next, the first address management unit 101a judges that the command CMD for "A processing-4" in the address of "8" is the code for the command CMDa for the A processing, and since the command for the A processing exists among the addresses to the address in the address of "8" in which the parallel processing completion bit exists, the first address management unit 101a judges that the command being executed by the first processing execution unit 104a is not the final command, and determines the first final address flag 103a to be off.

The second address management unit 101b does not instruct the second processing execution unit 104b to execute the new command because the second processing execution unit 104b is executing the command.

Next, the third address management unit 101c receives the completion notification CMP from the third processing execution unit 104c to thus refer to the commands in order from the address ADD after the third execution address 102c in the address of "4." The third address management unit 101c judges that the command CMD for "A processing-3" in the address of "5" is not the code for the command CMDc for the C processing. Next, the third address management unit 101c judges that the command CMD for "B processing-2" in the address of "6" is not the code for the command CMDc for the C processing. Next, the third address management unit 101c judges that the command CMD for "C processing-2" in the address of "7" is the code for the command CMDc for the C processing, records the address ADD in the address of "7" as the third execution address 102c, supplies the command CMD for "C processing-2" to the third processing execution unit 104c as the command CMDc for the C processing, and supplies the execution instruction INS to the third processing execution unit 104c to thereby instruct the third processing execution unit 104c to execute the command CMDc. Then, the third processing execution unit 104c starts the execution of the command CMDc for "C processing-2." Next, the third processing execution unit 104c is in execution and similarly to the above, the command CMD for "A processing-4" in the address of "8" is not the code for the command CMDc for the C processing and the parallel processing completion bit exists thereafter, so that the third address management unit 101c judges that the command for "C processing-2" being executed by the third processing execution unit 104c is the final command, and rewrites the third final address flag 103c to on from off.

Thereby, the parallel processing in the three processing execution units 104a, 104b, and 104c is performed. Thereafter, the parallel processing device waits until the execution of one of the commands by the processing execution units 104a, 104b, and 104c is completed.

Figure 8A:
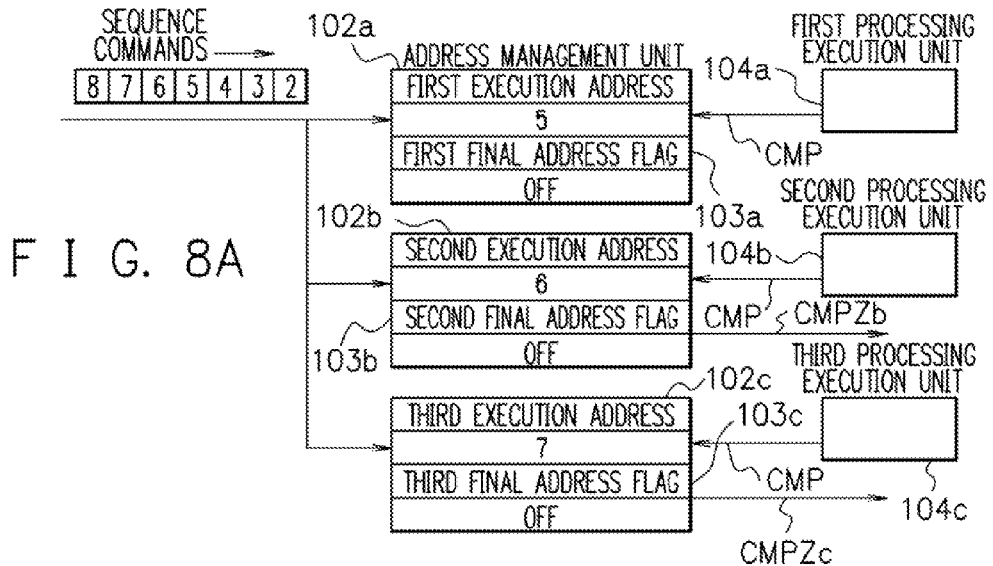
FIG. 8A and FIG. 8B are views each for explaining a processing example of the parallel processing device in FIG. 1.

Next, as depicted in FIG. 8A, when completing the execution of the command, the first processing execution unit 104a outputs the completion notification CMP to the first address management unit 101a, when completing the execution of the command, the second processing execution unit 104b outputs the completion notification CMP to the second address management unit 101b, and when completing the execution of the command, the third processing execution unit 104c outputs the completion notification CMP to the third address management unit 101c. When receiving the completion notification CMP, the first address management unit 101a outputs the processing completion notification CMPAa at high level because the first final address flag 103a is off. When receiving the completion notification CMP, the second address management unit 101b, due to the second final address flag 103b being on, outputs a final processing completion notification CMPZb at high level and rewrites the second final address flag 103b to off. When receiving the completion notification CMP, the third address management unit 101c, due to the second final address flag 103b being on, outputs a final processing completion notification CMPZc at high level and rewrites the third final address flag 103c to off. When receiving the processing completion notification CMPAa at high level, the logical sum circuit 116 outputs the processing completion notification at high level to the processing sequence management unit 111. Then, the processing sequence management unit 111 outputs the addresses ADD of the address ADD in the address of "2" in which the parallel processing start bit exists to the address ADD in the address of "8" in which the parallel processing completion bit exists that are recorded by the parallel processing interval storage section 112 in sequence again similarly to the above. Then, correspondingly, the sequence command storage memory 114 outputs the commands CMD of the command CMD in the address of "2" (including the parallel processing start bit) to the command CMD in the address of "8" (including the parallel processing completion bit) in sequence again similarly to the above.

Incidentally, a logical product (AND) circuit 117 outputs a logical product signal of a final processing completion notification CMPZa, and the final processing completion notifications CMPZb and CMPZc. In the above case, the final processing completion notifications CMPZb and CMPZc are at high level, but the final processing completion notification CMPZa is low level, and thus the logical product circuit 117 outputs a final processing completion notification at low level.

Figure 8B:
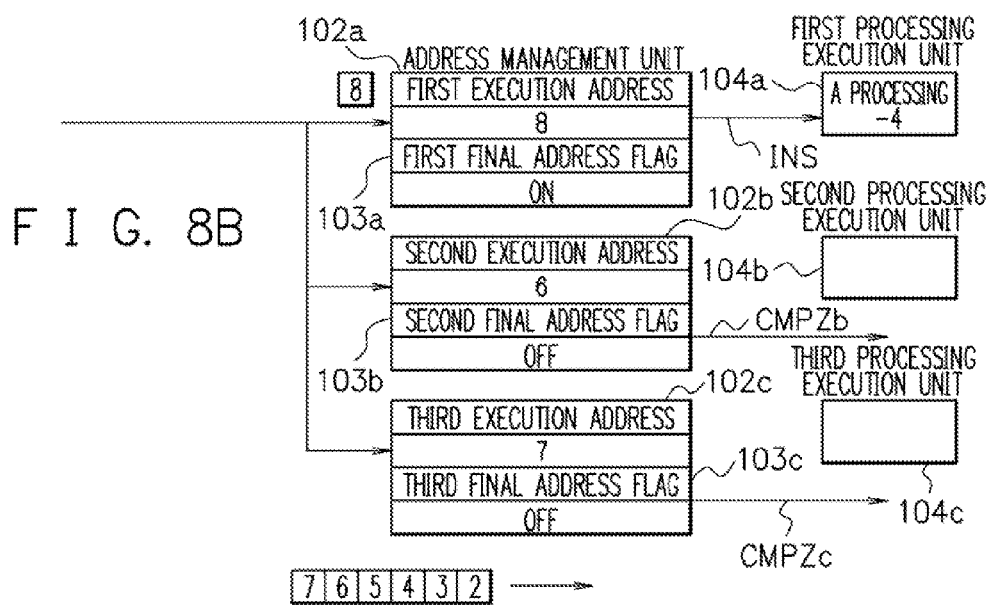

Next, the first address management unit 101a receives the completion notification CMP from the first processing execution unit 104a to thus refer to the commands in order from the address ADD after the first execution address 102a in the address of "5." The first address management unit 101a judges that the command CMD for "B processing-2" in the address of "6" is not the code for the command CMDa for the A processing. Next, the first address management unit 101a judges that the command CMD for "C processing-2" in the address of "7" is not the code for the command CMDa for the A processing. Next, as depicted in FIG. 8B, the first address management unit 101a judges that the command CMD for "A processing-4" in the address of "8" is the code for the command CMDa for the A processing, records the address ADD in the address of "8" as the first execution address 102a, supplies the command CMD for "A processing-4" to the first processing execution unit 104a as the command CMDa for the A processing, and supplies the execution instruction INS to the first processing execution unit 104a to thereby instruct the first processing execution unit 104a to execute the command CMDa. Then, the first processing execution unit 104a starts the execution of the command CMDa for "A processing-4." Next, when receiving the parallel processing completion bit in the address of "8," the first address management unit 101a judges that the command for "A processing-4"

being executed by the first processing execution unit 104a is the final command, and rewrites the first final address flag 103a to on from off.

Thereafter, the parallel processing device waits until the execution of the command by the first processing execution unit 104a is completed.

Figure 9:
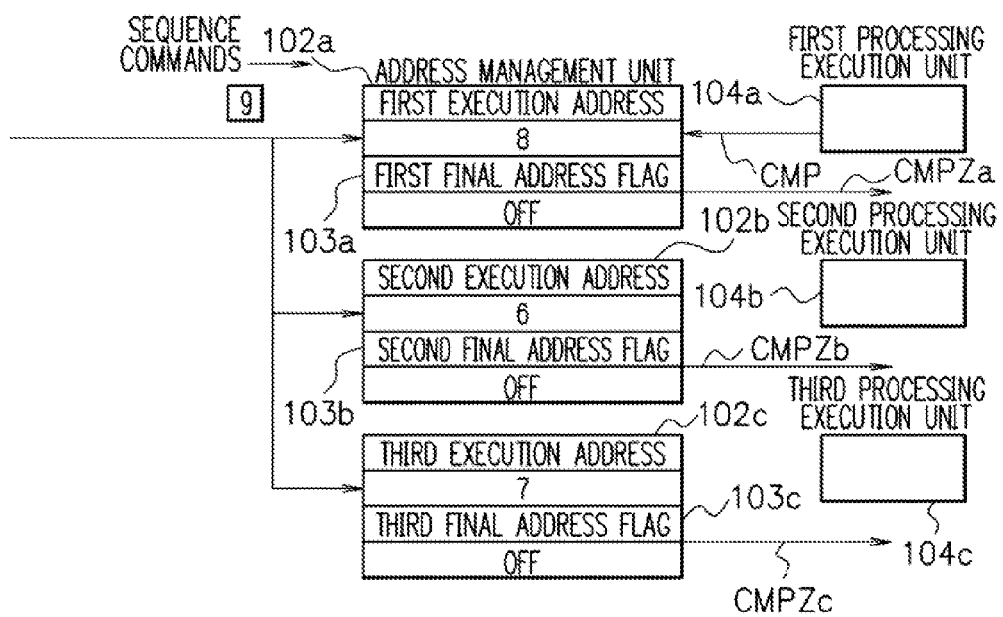
FIG. 9 is a view for explaining a processing example of the parallel processing device in FIG. 1.

Next, as depicted in FIG. 9, when completing the execution of the command, the first processing execution unit 104a outputs the completion notification CMP to the first address management unit 101a. When receiving the completion notification CMP, the first address management unit 101a, due to the first final address flag 103a being on, outputs the final processing completion notification CMPZa at high level and rewrites the first final address flag 103a to off. When receiving the final processing completion notifications CMPZa, CMPZb, and CMPZc at high level, the logical product circuit 117 outputs the final processing completion notification at high level to the parallel processing bit extraction unit 115. Then, the parallel processing bit extraction unit 115 outputs the parallel processing execution instruction signal PAL1 at low level to the processing sequence management unit 111, the address management units 101a, 101b, and 101c. Then, the processing sequence management unit 111, the address management units 101a, 101b, and 101c complete the control of the parallel processing and perform the processing similar to that in the above-described address ADD of the address of "1."

That is, the processing sequence management unit 111, due to the parallel processing execution instruction signal PAL1 being at low level, increments the address ADD by the address control section 113 to output the subsequent address ADD in the address of "9." When receiving the address ADD in the address of "9," the sequence command storage memory 114 outputs the command CMD for "B processing-3" stored in the address ADD of the address of "9" to the parallel processing bit extraction unit 115, the address management units 101a, 101b, and 101c. The parallel processing bit extraction unit 115 does not receive the parallel processing start bit or the parallel processing completion bit from the sequence command storage memory 114 to thus let the parallel processing execution instruction signal PAL1 and the parallel processing interval notification signal PAL2 remain at low level.

The first address management unit 101a judges that the received command CMD for "B processing-3" in the address of "9" is not the code for the command CMDa for the A processing and does not instruct the first processing execution unit 104a to execute the command.

The second address management unit 101b judges that the received command CMD for "B processing-3" in the address of "9" is the code for the command CMDb for the B processing, supplies the command CMD to the second processing execution unit 104b as the command CMDb for the B processing, and supplies the execution instruction INS to the second processing execution unit 104b to thereby instruct the second processing execution unit 104b to execute the command CMDb. Then, the second processing execution unit 104b starts the execution of the command CMDb.

The third address management unit 101c judges that the received command CMD for "B processing-3" in the address of "9" is not the code for the command CMDc for the C processing and does not instruct the third processing execution unit 104c to execute the command.

When completing the execution of the command CMDb, the second processing execution unit 104b outputs the completion notification CMP to the second address management unit 101b. Then, the second address management unit 101b outputs the processing completion notification CMPAb at high level. Then, the logical sum circuit 116 outputs the processing completion notification at high level.

Then, the processing execution unit 111, due to the parallel processing execution instruction signal PAL1 being at low level, increments the address ADD by the address control section 113 and outputs the address ADD in the address of "10." When receiving the address ADD in the address of "10," the sequence command storage memory 114 outputs the command CMD stored in the address ADD of the address of "10." Hereinafter, the processing similar to the above is performed repeatedly.

Incidentally, in this embodiment, there has been explained the case where three pairs of the address management units 101a, 101b, and 101c and the processing execution units 104a, 104b, and 104c exist as an example, but two pairs may be applied, or four or more pairs may also be applied. As the pairs of the address management units 101a, 101b, and 101c and the processing execution units 104a, 104b, and 104c, it is sufficient as long as two or more pairs exist.

As described above, when the parallel processing execution instruction signal PAL1 is at high level, the processing sequence management unit 111 reads the sequence commands of the command corresponding to the parallel processing start bit in the address of "2" to the command corresponding to the parallel processing completion bit in the address of "8" from the sequence command storage memory 114 in sequence to make the sequence command storage memory 114 output the sequence commands to the first address management unit 101a, the second address management unit 101b, and the third address management unit 101c.

The first address management unit 101a refers to the sequence commands read from the sequence command storage memory 114 in order from the head to find the command that the first processing execution unit 104a executes, and then instructs the first processing execution unit 104a to execute the command.

The second address management unit 101b refers to the sequence commands read from the sequence command storage memory 114 in order from the head to find the command that the second processing execution unit 104b executes, and then instructs the second processing execution unit 104b to execute the command.

The third address management unit 101c refers to the sequence commands read from the sequence command storage memory 114 in order from the head to find the command that the third processing execution unit 104c executes, and then instructs the third processing execution unit 104c to execute the command.

When the first processing execution unit 104a, the second processing execution unit 104b, or the third processing execution unit 104c completes the execution of the command, the processing sequence management unit 111 receives the processing completion notification at high level from the logical sum circuit 116, and reads the sequence commands of the command corresponding to the parallel processing start bit in the address of "2" to the command corresponding to the parallel processing completion bit in the address of "8" from the sequence command storage memory 114 in sequence again to make the sequence command storage memory 114 output the sequence commands to the first address management unit 101a, the second address management unit 101b, and the third address management unit 101c.

When the execution of the command by the first processing execution unit 104a is completed, the first address management unit 101a refers to the sequence commands read from the sequence command storage memory 114 in order from the address after the address of the command whose execution is completed and finds the command that the first processing execution unit 104a executes, and then instructs the first processing execution unit 104a to execute the command.

When the execution of the command by the second processing execution unit 104b is completed, the second address management unit 101b refers to the sequence commands read from the sequence command storage memory 114 in order from the address after the address of the command whose execution is completed and finds the command that the second processing execution unit 104b executes, and then instructs the second processing execution unit 104b to execute the command.

When the execution of the command by the third processing execution unit 104c is completed, the third address management unit 101c refers to the sequence commands read from the sequence command storage memory 114 in order from the address after the address of the command whose execution is completed and finds the command that the third processing execution unit 104c executes, and then instructs the third processing execution unit 104c to execute the command.

When the execution of the final command that the first processing execution unit 104a executes is completed among the sequence commands of the command corresponding to the parallel processing start bit in the address of "2" to the command corresponding to the parallel processing completion bit in the address of "8," the first address management unit 101a outputs the final processing completion notification CMPZa at high level indicating that the execution of the final command is completed.

When the execution of the final command that the second processing execution unit 104b executes is completed among the sequence commands of the command corresponding to the parallel processing start bit in the address of "2" to the command corresponding to the parallel processing completion bit in the address of "8," the second address management unit 101b outputs the final processing completion notification CMPZb at high level indicating that the execution of the final command is completed.

When the execution of the final command that the third processing execution unit 104c executes is completed among the sequence commands of the command corresponding to the parallel processing start bit in the address of "2" to the command corresponding to the parallel processing completion bit in the address of "8," the third address management unit 101c outputs the final processing completion notification CMPZc at high level indicating that the execution of the final command is completed.

The first address management unit 101a stores the first final address flag 103a indicating whether or not the first processing execution unit 104a is executing the final command. The second address management unit 101b stores the second final address flag 103b indicating whether or not the second processing execution unit 104b is executing the final command. The third address management unit 101c stores the third final address flag 103c indicating whether or not the third processing execution unit 104c is executing the final command.

When the final processing completion notifications CMPZa, CMPZb, and CMPZc at high level are output from the first address management unit 101a, the second address management unit 101b, and the third address management unit 101c, the parallel processing execution instruction signal PAL1 becomes low level and the processing sequence management unit 111 reads the command in the address of "9," which is in the next address after the command corresponding to the parallel processing completion bit in the address of "8," from the sequence command storage memory 114 to make the sequence command storage memory 114 output the command in the address of "9" to the first address management unit 101a, the second address management unit 101b, and the third address management unit 101c.

According to this embodiment, the first address management unit 101a, the second address management unit 101b, and the third address management unit 101c find their own commands from the sequence commands respectively, so that it is possible to make the processing sequence management unit 111 small-sized. This makes the parallel processing device possible to parallel process the commands in a small-scale configuration.

In this embodiment, even though any execution among the executions by the processing execution units 104a, 104b, and 104c is first completed, the processing sequence management unit 111 can correspond to the processing only by performing the same processing repeatedly. Further, in the above, the case where the parallelism is three has been explained as an example, but the number of parallelism can be changed only by preparing a necessary number of the processing execution units 104a, 104b, and 104c and the address management units 101a, 101b, and 101c. Further, the address management units 101a, 101b, and 101c judge the commands to receive next based on the addresses 102a, 102b, and 102c of the executed commands, and thus there is no limit in the number of commands. Further, in this embodiment, it is also possible to accelerate the processing speed (operating frequency) under predetermined conditions.

(Second Embodiment)

Figure 10:
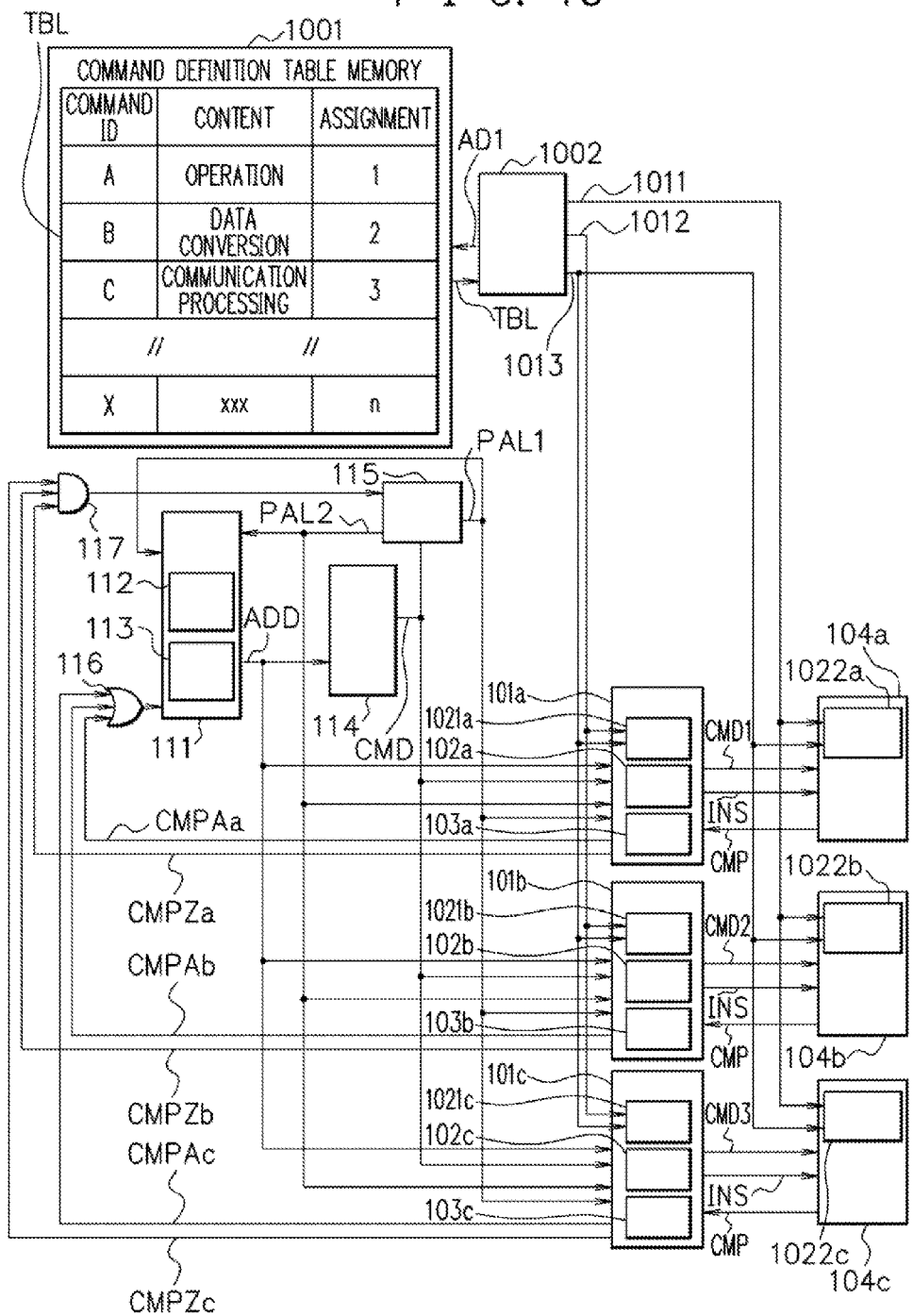
FIG. 10 is a view depicting a configuration example of a parallel processing device according to a second embodiment.

FIG. 10 is a view depicting a configuration example of a parallel processing device according to a second embodiment. The parallel processing device in FIG. 10 is one in which a command definition table memory 1001 and a command assign management unit 1002 are added to the parallel processing device in FIG. 1. In the first embodiment, the commands for the processing that the first processing execution unit 104a, the second processing execution unit 104b, and the third processing execution unit 104c execute are fixed. In this embodiment, commands for processing that the first processing execution unit 104a, the second processing execution unit 104b, and the third processing execution unit 104c execute are made variable, so that it is possible to assign commands for processing in advance. Hereinafter, the point where this embodiment is different from the first embodiment will be explained.

The command definition table memory 1001 stores a command definition table TBL. In the command definition table TBL, the content of the command and the number of the processing execution unit 104a, 104b, or 104c to which the command is assigned are stored in each command ID (identifier). For example, the command with the command ID of "A" has the command content of "operation" and is assigned to the first processing execution unit 104a. The command with the command ID of "B" has the command content of "data conversion" and is assigned to the second processing execution unit 104b. The command with the command ID of "C" has the command content of "communication processing" and is assigned to the third processing execution unit 104c.

The command assign management unit 1002 outputs a definition table address AD1 to the command definition table memory 1001 at the time of initialization of the parallel processing device, for example. Then, the command definition table memory 1001 outputs the command definition table TBL stored in the definition table address AD1 to the command assign management unit 1002. The command assign management unit 1002, based on the command definition table TBL, outputs a command ID 1012 of the command assigned to the first processing execution unit 104a to the first address management unit 101a, outputs a command ID 1012 of the command assigned to the second processing execution unit 104b to the second address management unit 101b, and outputs a command ID 1012 of the command assigned to the third processing execution unit 104c to the third address management unit 101c. Further, the command assign management unit 1002, based on the command definition table TBL, outputs configuration information 1011 of the command assigned to the first processing execution unit 104a to the first processing execution unit 104a, outputs configuration information 1011 of the command assigned to the second processing execution unit 104b to the second processing execution unit 104b, and outputs configuration information 1011 of the command assigned to the third processing execution unit 104c to the third processing execution unit 104c. Thereafter, the command assign management unit 1002 outputs an assignment completion signal 1013 to the address management units 101a, 101b, and 101c, and the processing execution units 104a, 104b, and 104c.

The first processing execution unit 104a stores the received configuration information 1011 of the command as first command configuration information 1022a therein, and by setting of the first command configuration information 1022a, connection of an internal circuit and the like are controlled and the execution of an assigned command CMD1 is made possible.

The second processing execution unit 104b stores the received configuration information 1011 of the command as second command configuration information 1022b therein, and by setting of the second command configuration information 1022b, connection of an internal circuit and the like are controlled and the execution of an assigned command CMD2 is made possible.

The third processing execution unit 104c stores the received configuration information 1011 of the command as third command configuration information 1022c therein, and by setting of the third command configuration information 1022c, connection of an internal circuit and the like are controlled and the execution of an assigned command CMD3 is made possible.

The first address management unit 101a has a first command ID holding section 1021a. The first command ID holding section 1021a holds the command ID 1012 received from the command assign management unit 1002. The first address management unit 101a can judge whether or not the received command is the command CMD1 that the first processing execution unit 104a executes by referring to the command ID held by the first command ID holding section 1021a. In the case when the received command is the command CMD1 that the first processing execution unit 104a executes, the first address management unit 101a supplies the command CMD1 to the first processing execution unit 104a and instructs the first processing execution unit 104a to execute the command CMD1.

The second address management unit 101b has a second command ID holding section 1021b. The second command ID holding section 1021b holds the command ID 1012 received from the command assign management unit 1002. The second address management unit 101b can judge whether or not the received command is the command CMD2 that the second processing execution unit 104b executes by referring to the command ID held by the second command ID holding section 1021b. In the case when the received command is the command CMD2 that the second processing execution unit 104b executes, the second address management unit 101b supplies the command CMD2 to the second processing execution unit 104b and instructs the second processing execution unit 104b to execute the command CMD2.

The third address management unit 101c has a third command ID holding section 1021c. The third command ID holding section 1021c holds the command ID 1012 received from the command assign management unit 1002. The third address management unit 101c can judge whether or not the received command is the command CMD3 that the third processing execution unit 104c executes by referring to the command ID held by the third command ID holding section 1021c. In the case when the received command is the command CMD3 that the third processing execution unit 104c executes, the third address management unit 101c supplies the command CMD3 to the third processing execution unit 104c and instructs the third processing execution unit 104c to execute the command CMD3.

As described above, the command assign management unit 1002 assigns the command that the first processing execution unit 104a executes to the first processing execution unit 104a and the first address management unit 101a, assigns the command that the second processing execution unit 104b executes to the second processing execution unit 104b and the second address management unit 101b, and assigns the command that the third processing execution unit 104c executes to the third processing execution unit 104c and the third address management unit 101c. After the above-described assignments are completed, the processing similar to that in the first embodiment can be performed.

According to this embodiment, the commands that the first processing execution unit 104a, the second processing execution unit 104b, and the third processing execution unit 104c execute can be assigned arbitrarily.

The first address management unit and the second address management unit find the commands, so that it is possible to parallel process the commands in a small-scale configuration.

Note that the above-described embodiments are to be considered in all respects as illustrative and no restrictive, and all changes which come within the meaning and range of equivalency of the claims are therefore intended to be embraced therein. Namely, the embodiments may be embodied in other specific forms without departing from the spirit or essential characteristics thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A parallel processing device, comprising:
a first processing execution unit that executes a command;
a first address management unit that instructs the first processing execution unit to execute a command;
a second processing execution unit that executes a command different from the command that the first processing execution unit executes, in parallel with the execution by the first processing execution unit;

a second address management unit that instructs the second processing execution unit to execute a command;

a sequence command storage memory that stores a sequence command in each address, stores a command for parallel processing start in a manner to correspond to a parallel processing start bit, and stores a command for parallel processing completion in a manner to correspond to a parallel processing completion bit; and a processing sequence management unit that reads the sequence commands of the command corresponding to the parallel processing start bit to the command corresponding to the parallel processing completion bit from the sequence command storage memory in sequence to make the sequence command storage memory output the sequence commands to the first address management unit and the second address management unit, in a first cycle, wherein the first address management unit, when referring to the sequence commands read from the sequence command storage memory in order from the head command in the sequence commands to find the command that the first processing execution unit executes, instructs the first processing execution unit to execute the command, the second address management unit, when referring to the sequence commands read from the sequence command storage memory in order from the head command in the sequence commands to find the command that the second processing execution unit executes, instructs the second processing execution unit to execute the command, the first address management unit stores an address of a first command that the first processing execution unit is executing, the second address management unit stores an address of a second command that the second processing execution unit is executing, when at least the first processing execution unit or the second processing execution unit completes the execution of the command, the processing sequence management unit reads the sequence commands of the command corresponding to the parallel processing start bit to the command corresponding to the parallel processing completion bit from the sequence command storage memory in sequence again to make the sequence command storage memory output the sequence commands to the first address management unit and the second address management unit, in a second cycle, when the execution of the first command by the first processing execution unit is completed, the first address management unit refers to the sequence commands read from the sequence command storage memory in order from the address after the address of the first command whose execution is completed and finds a command that the first processing execution unit executes, and then instructs the first processing execution unit to execute the command that the first processing execution unit executes, when the execution of a second command by the second processing execution unit is completed, the second address management unit refers to the sequence commands read from the sequence command storage memory in order from the address after the address of the second command whose execution is completed and finds a command that the second processing execution unit executes, and then instructs the second processing execution unit to execute the command that the second processing execution unit executes, in the first cycle, the first processing execution unit or the second processing execution unit executes only part of the sequence commands of the command corresponding to the parallel processing start bit to the command corresponding to the parallel processing completion bit, and in the second cycle, the first processing execution unit or the second processing execution unit does not execute the part of the sequence commands of the command corresponding to the parallel processing start bit to the command corresponding to the parallel processing completion bit, but executes another command of the sequence commands of the command corresponding to the parallel processing start bit to the command corresponding to the parallel processing completion bit.

2. The parallel processing device according to claim 1, wherein when among the sequence commands of the command corresponding to the parallel processing start bit to the command corresponding to the parallel processing completion bit, the execution of the final command that the first processing execution unit executes is completed, the first address management unit outputs information indicating that the execution of the final command is completed, when among the sequence commands of the command corresponding to the parallel processing start bit to the command corresponding to the parallel processing completion bit, the execution of the final command that the second processing execution unit executes is completed, the second address management unit outputs information indicating that the execution of the final command is completed, and when the information indicating that the execution of the final command is completed is output from at least the first address management unit and the second address management unit, the processing sequence management unit reads the command in the address subsequent to the command corresponding to the parallel processing completion bit from the sequence command storage memory to make the sequence command storage memory output the command to the first address management unit and the second address management unit.

3. The parallel processing device according to claim 2, wherein the first address management unit stores a first final address flag indicating whether or not the first processing execution unit is executing the final command, and the second address management unit stores a second final address flag indicating whether or not the second processing execution unit is executing the final command.

4. The parallel processing device according to claim 1, further comprising:

a command assign management unit that assigns the command that the first processing execution unit executes to the first processing execution unit and the first address management unit and assigns the command that the second processing execution unit executes to the second processing execution unit and the second address management unit.

* * * * *